L. D. LOVEKIN.
WATER HEATER.
APPLICATION FILED NOV. 8, 1907.

983,912.

Patented Feb. 14, 1911.

5 SHEETS—SHEET 1.

WITNESSES:

INVENTOR

BY

ATTORNEY.

L. D. LOVEKIN.
WATER HEATER.
APPLICATION FILED NOV. 8, 1907.

983,912.

Patented Feb. 14, 1911.
5 SHEETS—SHEET 4.

WITNESSES:

INVENTOR
BY
ATTORNEY.

L. D. LOVEKIN.
WATER HEATER.
APPLICATION FILED NOV. 8, 1907.

983,912.

Patented Feb. 14, 1911.
5 SHEETS—SHEET 5.

UNITED STATES PATENT OFFICE.

LUTHER D. LOVEKIN, OF PHILADELPHIA, PENNSYLVANIA.

WATER-HEATER.

983,912.  Specification of Letters Patent.  Patented Feb. 14, 1911.

Application filed November 8, 1907. Serial No. 401,232.

*To all whom it may concern:*

Be it known that I, LUTHER D. LOVEKIN, a citizen of the United States of America, residing in the city and county of Philadelphia, in the State of Pennsylvania, have invented a certain new and useful Improvement in Water-Heaters, of which the following is a true and exact description, reference being had to the accompanying drawings, which form a part thereof.

The present invention relates to water heaters, and particularly to heaters for water in which the source of heat is the flame from a gas or oil burner.

The object of the invention is to provide a compact heater of simple and durable construction in which the container or containers for the water to be heated is provided with heat abstracting ribs to increase the extent of the surface abstracting heat from the flame and transferring it to the water to be heated and to lengthen the path or paths through which the hot gases from the burner travel in contact with the container surface, thereby prolonging the time of contact and increasing the efficiency of the heat abstraction from the gases.

A further object of the invention is to so arrange the parts that the joints in the water container or containers are removed from proximity with the hotter portion of the heating gases while at the same time suitable provision is made for the proper circulation of the water heated.

In the preferred form of my invention the ribs are made hollow and contain water to be heated, and the container, or one of the containers of the heater, is, roughly speaking, in the form of a cylindrical body having the hollow ribs at its periphery and is surrounded by an external body which may be a second container for water to be heated or may be of refractory material of poor heat conductivity which is itself provided with internal ribs which project into the spaces between the ribs of the internal container.

The various features of novelty which characterize the invention are pointed out with particularity in the claims annexed to and forming a part of the specification. For a better understanding of the invention, however, and the advantages possessed by it, reference may be had to the accompanying drawings and descriptive matter in which I have illustrated forms in which my invention may be embodied.

Figure 1:
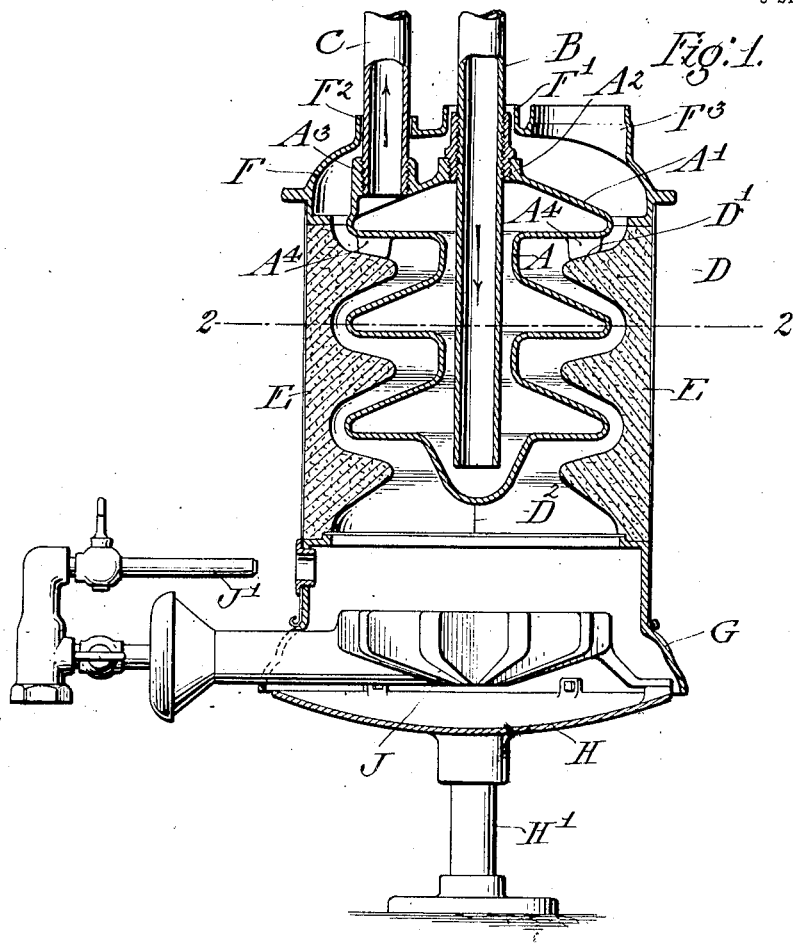
Figure 2:
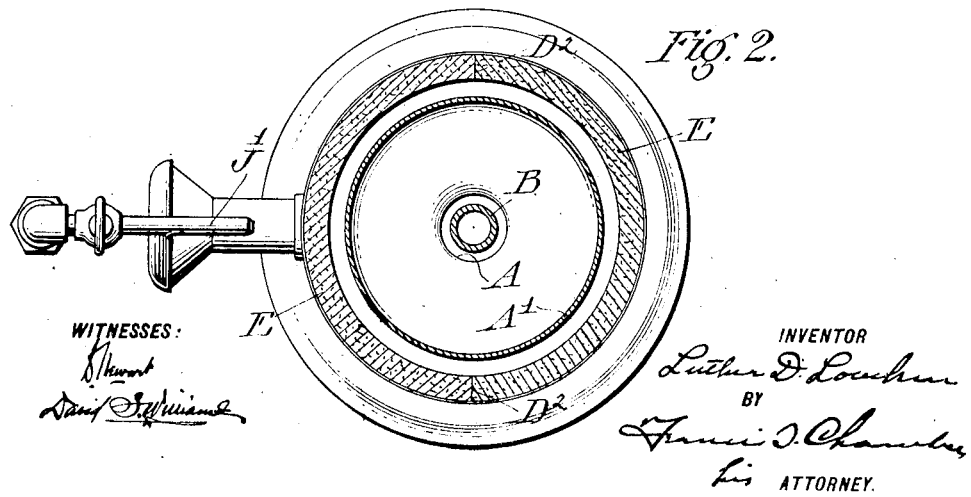
Figure 3:
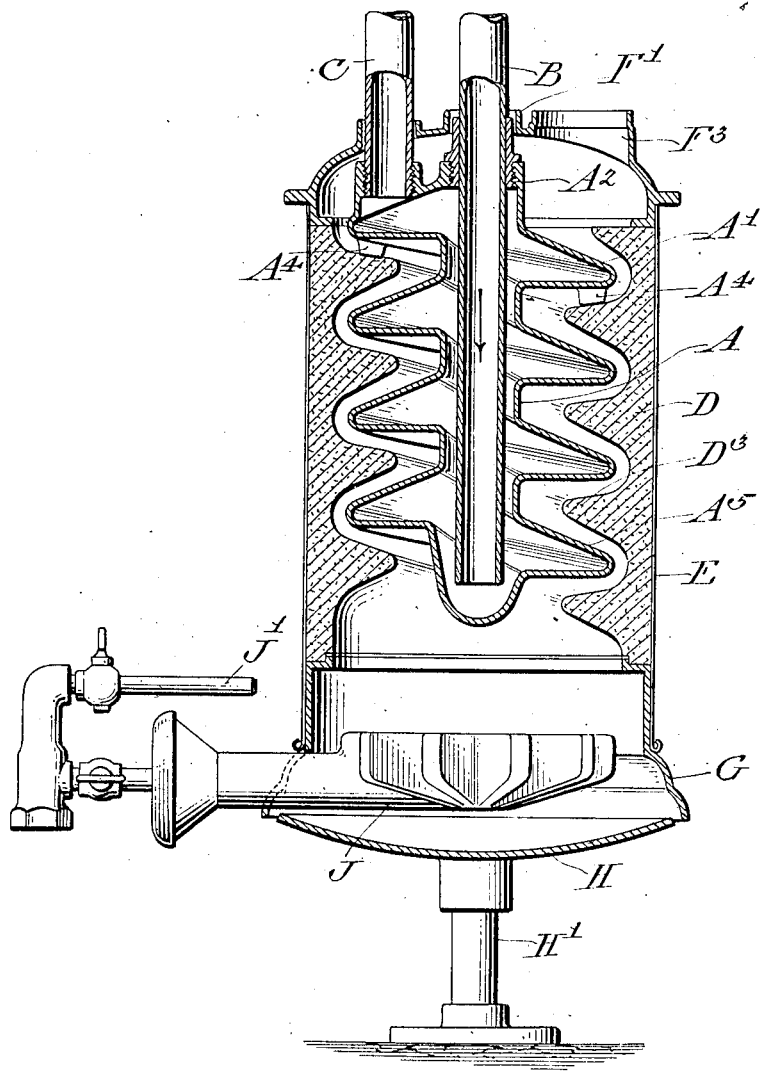
Figure 4:
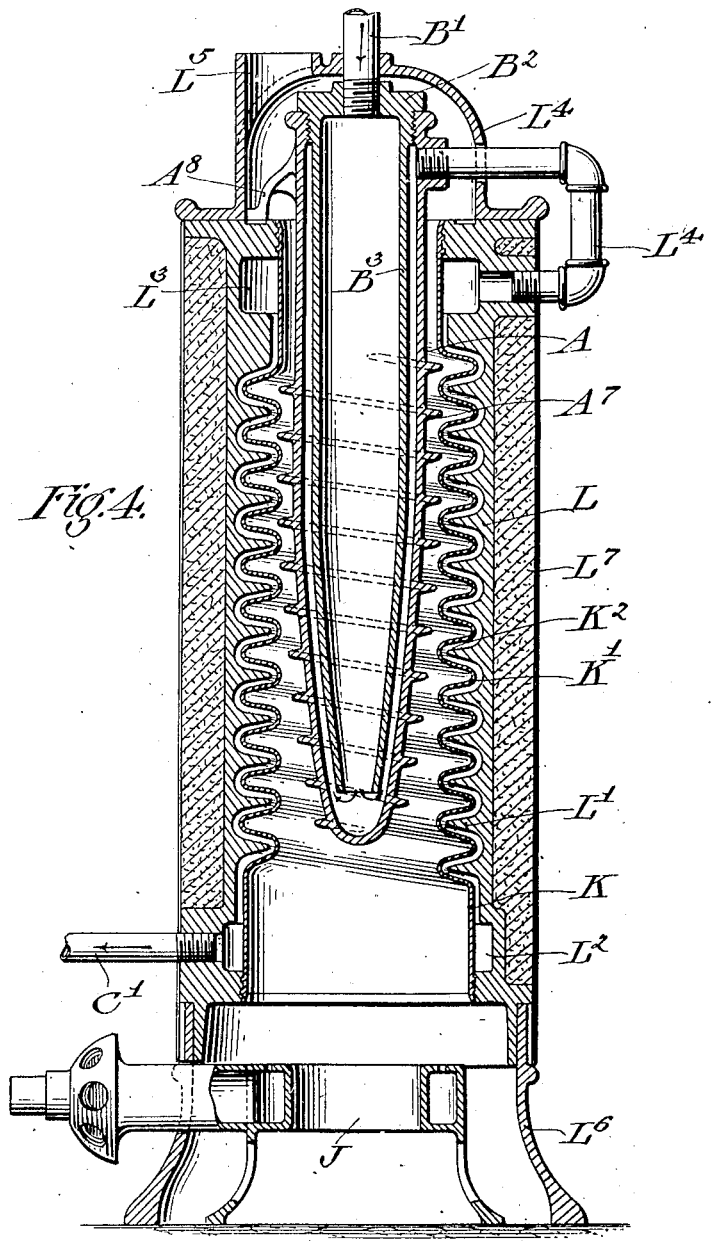
Figure 5:
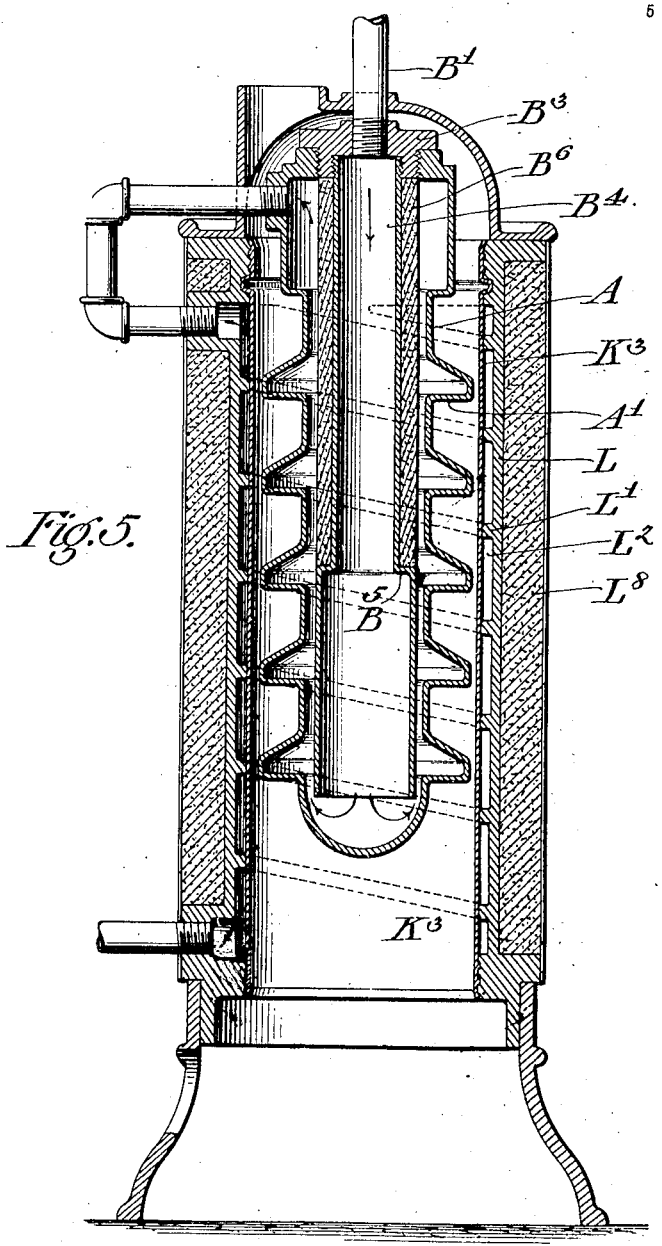
Figure 6:
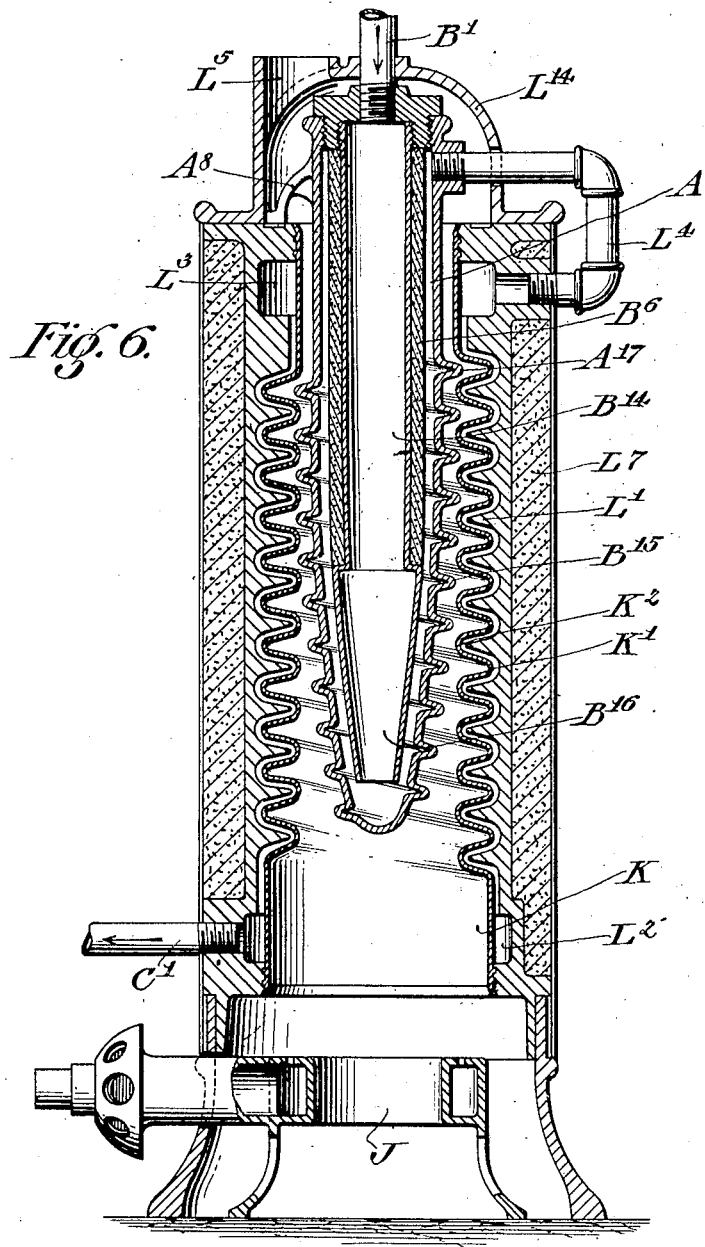

Of the drawings, Figure 1 is a sectional elevation of one form of my invention. Fig. 2 is a sectional plan taken on the line 2—2 of Fig. 1. Fig. 3 is a sectional elevation taken similarly to Fig. 1 showing a second form of my invention. Fig. 4 is a sectional elevation showing a third form of my invention. Fig. 5 is a sectional elevation showing a fourth form of the invention. Fig. 6 is a sectional elevation showing a fifth form of the invention.

In the drawings, and referring first to the construction of Fig. 1, A represents the container which is in the form of a hollow cylindrical body having formed on it at intervals along its length a series of hollow circular ribs $A'$ which are open internally to the interior of the container proper. The container has an axial opening $A^2$ formed in its upper end through which is inserted the inlet pipe B which extends nearly to the bottom of the container A. At the side of the opening $A^2$ is formed an opening $A^3$ into which is threaded the outlet conduit C. The container A is surrounded by a shell D formed of refractory material having poor heat conductivity. The shell D is provided with internal circular ribs $D'$ which extend into the spaces between the adjacent hollow ribs $A'$ of the container. In the form shown, the shell D is divided into two similar parts having meeting surfaces $D^2$, and is incased in a tubular shell or jacket E which connects the top and bottom members F and G. The bottom member G is mounted on a base member H to which it may be integrally or detachably connected. The member H is mounted on a pedestal $H'$, and supports within the jacket a gas burner J; $J'$ representing a pilot burner for starting the main burner J. The upper end member F is provided with flanged openings $F'$ and $F^2$ for the inlet and outlet pipes B and C, respectively, and with a flanged opening $F^3$ for the escape of the spent heating gases. The container may be supported from the top member of the heater, though by preference I provide lugs $A^4$ on the container which engage the adjacent portions of the shell D to position the parts, and may well serve as a means by which the container is supported from the shell.

With the construction described it will be observed that the only joints in the water container are located at the extreme upper end of the heater where they are removed from proximity to the hotter portions of the heating gases. The water passes downward through the inlet pipe B to the lower end of the container, absorbing heat from the extended wall of the container A. The arrangement of the ribs A' and D' lengthens the path through which the heating gases travel in contact with the container A, and thereby prolongs the time of contact, thus insuring that a large proportion of the heat of the hot gases is abstracted before the gases escape through the opening F³. By making the hollow ribs A' thin in the axial direction, as shown, the water spaces in them are made shallow, so that the extent of heating surface to volume of water in the heater at any instant is relatively large, thus adapting the device for use as an "instantaneous heater." It should be observed that the upper internal surface of each hollow rib slants upward to the center of the container, thus facilitating the proper circulation through the container.

The construction shown in Fig. 3 differs from that of Figs. 1 and 2 in that in this case the circumferentially extending ribs on the outer surface of the container are formed by the convolutions of a hollow continuous spiral or corrugation. Similarly the ribs on the jacket are formed in a continuous spiral D³. With these arrangements the container A and jacket D may be readily assembled by screwing the parts together, thus avoiding the necessity for dividing the jacket D into parts, while at the same time all of the other advantages of the construction first described are obtained. The spiral arrangement of ribs A⁵ and D³ also possesses the advantage of giving a definite spiral whirl to the heating gases from the burner J.

In the construction shown in Fig. 4, the container A is provided on its periphery with a continuous spiral A⁷, which in this case is solid, and the container A is surrounded by an external container, the inner wall of which is formed by a tubular member K, which is spirally corrugated between its ends to form externally projecting hollow ribs K' and corresponding grooves K². The outer wall of the external container is formed by a tubular member L provided with an internal thread L'. The members K and L may be readily assembled by threading them together as may the container A and the assembled external container. The members K and L when assembled are secured together at their ends as by expanding the member K. The external shell L in the form shown is provided with a channel L² at its lower end from which leads the outlet pipe C', and at its upper end with a channel L³ which is connected by a conduit L⁴ to the upper end of the container A. The inlet pipe B' in this construction is coupled into a member B² which closes the central opening in the upper end of the container A, and has a tubular extension B³ which extends nearly to the lower end of the container proper. The space between the internal and external containers is closed by a top member L⁴ provided with a flanged opening L⁵ for the escape of the spent hot gases. The container A is supported in this case by lugs A⁸ which bear upon the upper end of the member L, and the member L is supported in turn by a base member L⁶ in which the burner J may be installed. The member L is preferably incased in a heat insulating jacket L⁷.

In the form of the invention shown in Fig. 4, it will be observed that the water to be heated passes in series from the tubular extension B³ through the internal container A and the external container. The heat abstraction is facilitated by the provision on each container of ribs which increase the heating surfaces and serve as baffle plates to prolong the path of the hot gases. In this construction, as well as those previously described, the internal container is provided with ribs which extend into the spaces formed by ribs on the external jacket, but in this case the incasing jacket is itself a water container. The external container disclosed is novel with me, but is not specifically claimed herein as it forms the subject matter of my co-pending application Serial No. 401,231, filed of even date herewith.

The construction of Fig. 5 differs from that of Fig. 4 in the following respects. The external member of the internal container A is substantially identical with the container A of Fig. 1. The internal member B⁴ in this construction, however, is formed by a tube which is threaded into the cap member B³, and has its upper portion reduced in diameter, thus forming a shoulder B⁵ at a point between the upper and lower ends of the member B⁴, and preferably between the lower end and the middle of the member B⁴. The reduced portion of the member B⁴ is surrounded by a jacket B⁶ of tile or the like which serves as a heat insulator to prevent the abstraction of heat from the water passing to the upper end of the container A by the inlet water. In this form the external container is formed by an internal tubular member K³, which is uncorrugated and bears against the ribs L' of the member L, thus forming with the member L and the ribs L a spiral passage L² for the water passing through the external container.

It will of course be understood that the inlet pipes of the heaters shown in Figs. 1, 3 and 4 may be surrounded by a heat insulating pipe like the tube B⁶ of Fig. 5.

In Fig. 6 I have shown a construction which differs from that shown in Fig. 4 merely in the fact that the rib $A^{17}$ on the container A is made hollow, whereas in Fig. 4 the corresponding rib $A^7$ is solid, and in the fact that the internal member $B^{14}$ of the container is shaped substantially like the container $B^4$ of Fig. 5, the portion of the member $B^{14}$ above shoulder $B^{15}$ being surrounded by a heat insulating jacket $B^6$ and the lower portion $B^{16}$ of the member $B^{14}$ being conical and conforming with the general contour of the lower end of the member A.

While in the construction shown in Figs. 1, 4, and 5 the inlet pipe to the central container must be separated from the body of the container sufficiently to allow the fluid being heated to ascend, it is apparent that with the construction of Fig. 3 it is not essential that any space should exist between the inlet pipe and the body of the central container as the hollow spiral ribs in any case permit the fluid heated to flow from the bottom to the top of the container.

While in accordance with the provisions of the statutes I have herein described and illustrated the best forms of my invention now known to me, it will be understood by those skilled in the art that changes may be made in the forms disclosed without departing from the spirit of the invention.

Having now described my invention, what I claim as new and desire to secure by Letters Patent is,

1. A water heater comprising a vertically disposed hollow water container having closed ends and being formed with circumferentially extending heat abstracting ribs on its outer surface and provided with an outlet opening at its upper end and an inlet conduit entering the container at the upper end of the latter and extending through the water space thereof to a point adjacent the lower end of the container, and an inclosing jacket surrounding the container and separated from it by a space forming a passage for the flow of a heating fluid.

2. A water heater comprising a vertically disposed water container formed with circumferentially extending heat abstracting ribs on its outer surface and provided with an outlet opening at its upper end and an inlet conduit leading through the upper end of the container to a point adjacent the lower end of the container, a heat insulating jacket surrounding the upper portion of said inlet conduit, and an inclosing jacket surrounding the container and separated from it by a space forming a passage for the flow of a heating fluid.

3. A water heater comprising a vertically disposed water container formed with circumferentially extending heat abstracting ribs on its outer surface, and provided with an outlet opening at its upper end and an internal conduit leading through the upper end of the container and formed adjacent its lower end with a shoulder, a heat insulating jacket surrounding the upper portion of said conduit and resting on said shoulder, and an inclosing jacket surrounding the container and separated from it by a space forming a passage for the flow of a heating fluid.

4. A water heater comprising a vertically disposed hollow water container having closed ends and being corrugated to form circumferentially extending hollow heat abstracting ribs projecting from its outer surface and provided with an outlet opening at its upper end and an inlet conduit entering the container at the upper end of the latter and extending through the water space thereof to a point adjacent the lower end of the container, and an inclosing jacket surrounding the container and separated from it by a space forming a passage for the flow of a heating fluid.

5. A water heater comprising a vertically disposed water container formed with circumferentially extending heat abstracting ribs on its outer surface and provided with an outlet opening at its upper end and an inlet conduit leading from the upper end of the container to a point adjacent the lower end of the container, and an inclosing jacket surrounding the internal container and separated from it by a space forming a passage for the flow of a heating fluid, said jacket having internal ribs extending between the ribs of the container.

6. A water heater comprising a vertically disposed water container having a heat abstracting spiral formed on its outer surface and provided with an outlet opening at its upper end and an inlet conduit leading from the upper end of the container to a point adjacent the lower end of the container, and an inclosing jacket surrounding the internal container and separated from it by a space forming a passage for the flow of a heating fluid, said jacket having an internal spiral extending between the convolutions of the spiral on the container.

7. A water heater comprising a vertically disposed internal water container formed with circumferentially extending heat abstracting ribs on its outer surface and provided with inlet and outlet connections at its upper end, an external water container surrounding the internal container and separated from it by a space forming a passage for the flow of a heating fluid, a pipe connection between the outlet opening of the internal container and the upper end of the space in the external container and a pipe connection leading from the lower end of the space in the inclosing jacket.

8. A water heater comprising a vertically disposed water container formed with circumferentially extending heat abstracting ribs on its outer surface and provided with inlet and outlet connections and an inclosing jacket surrounding said water container and separated from it by a space forming passage for the flow of the heating fluid, said jacket having internal circumferentially extending ribs lying between and projecting toward the space between, the ribs on said container.

9. A water heater comprising a vertically disposed water container formed with circumferentially extending heat abstracting corrugations and provided with inlet and outlet connections and an inclosing jacket surrounding said water container and separated from it by a space forming a passage for the flow of the heating fluid, said jacket having internal circumferentially extending ribs lying between and projecting toward the spaces between, the ribs formed in the outer surface of said container by reason of its corrugation.

LUTHER D. LOVEKIN.

Witnesses.
 ARNOLD KATZ,
 D. STEWART.